United States Patent [19]

Suzuki et al.

[11] 4,388,079

[45] Jun. 14, 1983

[54] COLOR SALT-CONTAINING OPTICAL BRIGHTENER COMPOSITION

[75] Inventors: Kazuaki Suzuki, Osaka; Shohei Kuwabara, Suita, both of Japan

[73] Assignee: Showa Kagaku Kogyo Co., Ltd., Hyogo, Japan

[21] Appl. No.: 284,534

[22] Filed: Jul. 20, 1981

[30] Foreign Application Priority Data

Jul. 22, 1980 [JP] Japan ................................ 55-99346

[51] Int. Cl.³ .................... C09B 23/14; D06P 1/41
[52] U.S. Cl. ............................................ 8/648; 8/638; 8/639; 8/654; 8/657; 252/301.21; 252/301.23; 252/301.24; 252/301.29
[58] Field of Search ................ 8/648, 638, 639, 654, 8/657; 252/301.21, 301.23, 301.24, 301.29

[56] References Cited

U.S. PATENT DOCUMENTS

| 3,600,373 | 8/1971 | Zickendraht | 8/521 |
| 3,690,916 | 9/1972 | Wesmuller et al. | 252/301.23 |
| 3,759,900 | 9/1973 | Horstman | 252/301.22 |

FOREIGN PATENT DOCUMENTS 45-06312  3/1970  Japan.
2082195  3/1982  United Kingdom.

*Primary Examiner*—A. Lionel Clingman
*Attorney, Agent, or Firm*—Wenderoth, Lind & Ponack

[57] ABSTRACT

This invention relates to an optical brightener composition comprising at least one optical brightener and at least one color salt consisting of an optical brightener component having at least one anionic group and a color component having at least one basic group capable of forming a slat with the anionic group, which composition has an excellent brightening effect capable of giving a clearer whiteness as well as a high light fastness.

10 Claims, No Drawings

COLOR SALT-CONTAINING OPTICAL BRIGHTENER COMPOSITION

BACKGROUND OF THE INVENTION

1. Field of the Invention

This invention relates to an optical brightener composition containing a novel color salt consisting of an anionic optical brightener component and a basic color component.

2. Description of the Prior Art

For the optical brightening of organic materials, up to the present time, it has often been proposed to use an optical brightener with a very small amount of a colored dye (mainly, dye of blue, violet or reddish violet type) so as to make clearer the brightening effect and to control finely the color tone of the brightening effect. The dye used herein should have a clear color from the intended use and many of such dyes are basic dyes. However, the basic dyes are hardly used in this field because of the disadvantage that the light fastness tance is low, and dyes having a relatively clear color tone are predominantly chosen from dyes of disperse type. Therefore, the clearness of color is not satisfied.

SUMMARY OF THE INVENTION

It is an object of the present invention to provide an optical brightener composition containing a novel color salt.

It is another object of the present invention to provide an optical brightener composition having a clear whitening effect.

It is a further object of the present invention to provide an optical brightener composition comprising an optical brightener and a color salt or color complex having an excellent light resistance as well as a good levelling property, as a blueing agent.

These object can be attained by an optical brightener composition comprising one or more optical brighteners and one or more color salts consisting of an optical brightener component having at least one anionic group and a color component having at least one basic group capable of forming a salt with the anionic group.

DETAILED DESCRIPTION OF THE INVENTION

When a coloring matter or an optical brightener is mixed with another coloring matter or another optical brightener to form a new composition, in general, their absorption curves in the visible range or ultraviolet range are interacted each other and the absorption maximum wavelengths are shifted, resulting in change of the color tone or optically brightening property. Thus it is very difficult to obtain a coloring agent or optical brightener with such a composition that the characteristics of the original components are held unchanged.

Moreover, in a new coloring agent or optical brightener obtained by combining chemically a coloring agent or an optical brightener with another coloring agent or another optical brightener, it is natural that the above described change is brought on because the chemical structures are completely different.

In view of the foregoing phenomenon, the color salt used in the present invention is also considered to have such a tendency that the original optical brightener component and color component are interacted each other to change the waveforms of the absorption curves and to shift the absorption maximum wavelengths, as described above, but it is surprisingly found that this color salt has the absorption band of the original optical brightener component in the ultraviolet range and the absorption band of the original color component in the visible range and has no change in waveforms, nor shift in absorption maximum wavelengths. That is, it is found that the color salt used in the present invention is a novel color salt having a clear and optically brightening color tone, in which the characteristics of the original optical brightener component and color component coexist, and that the color salt used in the present invention has a very clear color tone and exhibits a very excellent effect as the so-called blueing dye by choosing suitably a basic color component, one component of the color salt.

Accordingly, the present invention provides an optical brightener composition comprising one or more optical brighteners and one or more color salts consisting of an optical brightener component having at least one anionic group and a color component having at least one basic group capable of forming a salt with the anionic group.

The optical brightener component used in the color salt according to the present invention includes broadly compounds having at least one anionic group, for example, sulfonic acid group, carboxylic acid group or their alkali metal or ammonium salt group. These compounds have typically chemical structures of stilbene such as 4,4'-bistriazinylaminostilbene or 1,2,3-triazolylstilbene, 1,4-bisstyrylbenzene, 4,4'-bisstyrylbiphenylene, pyrazoline, coumarin, α,β-dioxazolyl- or diimidazolylethylene, pyrene and naphthalimide type.

The color component used in the color salt according to the present invention includes broadly compounds having at least one basic group capable of forming a salt with the anionic group of the above described optical brightener component, for example, cationized alkylamino group, acridine group, oxazine group, azino group, thiazine group or cationized nitrogen atom. These compounds have chemical structures of azo, anthraquinone, diphenylmethane, triphenylmethane, xanthene, acridine, azine, oxazine, thiazine, methine and phthalocyanine types. Above all, compounds of triphenylmethane type or xanthene type are most preferable.

As the optical brightener to be used together with the color salt in the present invention, any of known optical brighteners can be chosen depending upon the intended use. Typical examples of the optical brightener are:

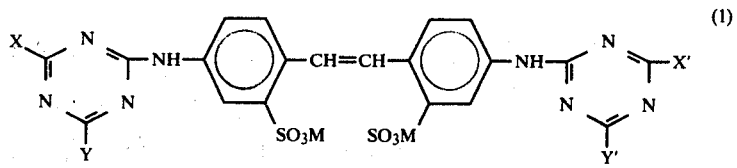

(wherein X, X', Y and Y' are halogen atoms, amino group, residual radicals of aliphatic, aromatic and heterocyclic amines or residual radicals of aliphatic and aromatic alcohols, and M is hydrogen atom, alkali metal or ammonium group which may be substituted)

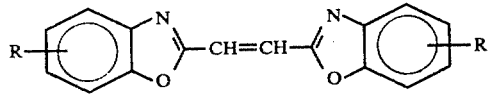 (2)

(wherein R is hydrogen atom or a lower alkyl group)

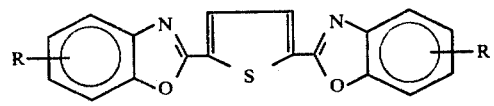 (3)

(wherein R is hydrogen atom or a lower alkyl group)

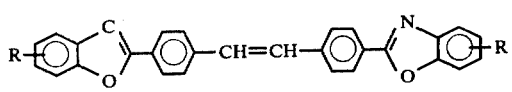 (4)

(wherein R is hydrogen atom or a lower alkyl group)

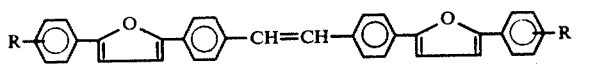 (5)

(wherein R is hydrogen atom or a lower alkyl group)

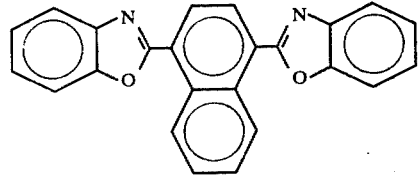 (6)

 (7)

(wherein R is hydrogen atom or a lower alkyl group)

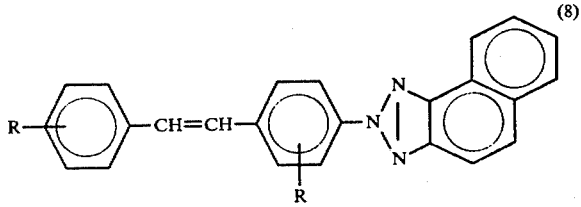 (8)

(wherein R is hydrogen atom or a lower alkyl group)

(9)

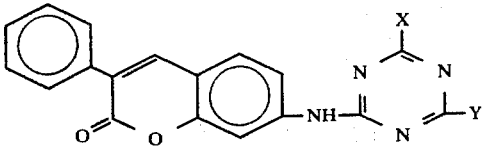 (10)

(wherein X and Y have the same meanings as in the above described formula 1))

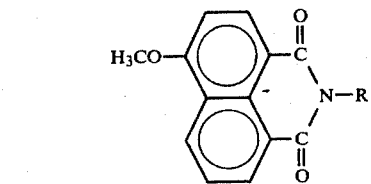 (11)

(wherein R is a lower alkyl group)

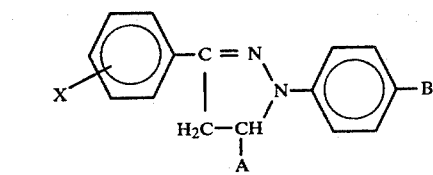 (12)

(wherein X is hydrogen atom or chlorine atom, A is hydrogen atom or phynyl group and B is —SO$_3$Na group or —SO$_2$NH$_2$)

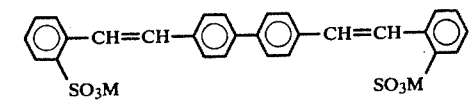 (13)

(wherein M is an alkali metal)

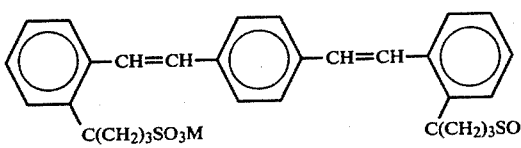 (14)

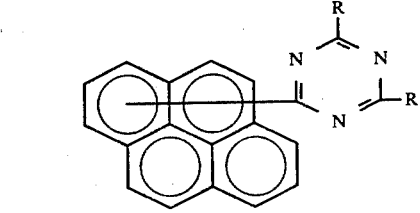 (15)

(wherein R is a lower alkoxy group)

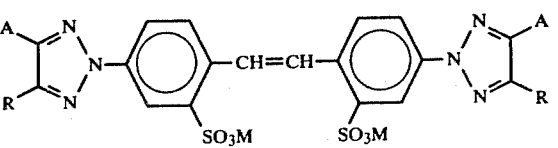 (16)

(wherein A is phenyl group, R is hydrogen atom or lower alkyl group and M is an alkali metal)

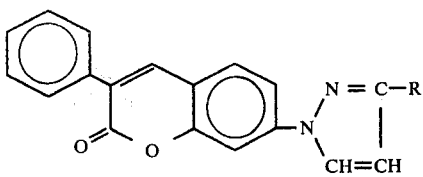
(17)

(wherein R is a lower alkyl group)

The color salt used in the present invention can readily be prepared as follows: An optical brightener component having at least one anionic group is dissolved in water or in a mixed medium of water and a water-soluble organic solvent, optionally heating, while a color component having at least one basic group capable of forming a salt with the above described anionic group is dissolved in water or in a mixed medium of water and a water-soluble organic solvent, optionally by heating. Both the resulting solutions are mixed optionally after filtration if there are insoluble matters. At this time, heating can optionally be carried out. In many cases, a salt-forming reaction takes place immediately between both the components to precipitate a color salt or color complex. Thus, it can be regarded as the end point of the salt-forming reaction when the optical brightening or color disappears nearly. This can readily be distinguished by observing a color stain when a filter paper is spotted with the mixed solution. The salt-forming reaction can also be carried out by adding an optical brightening component powder or a color component powder directly to a solution of a color component or optical brightener component.

The color salt-containing optical brightener composition of the present invention can be prepared as follows: In a process for preparing an optical brightener, insoluble matters in the reaction mixture after the reaction are removed by filtration, the pH of the filtrate is adjusted to neutral to alkaline, and a basic color component is then added thereto. During the same time, the quantity of the color component is controlled suitably, thus obtaining an optical brightener composition in which a color salt is contained, formed from the optical brightener and the basic color component. The composition obtained in this way is sufficiently precipitated optionally by salting out, filtered, dried and pulverized to obtain an object in a powdered form.

This composition is also capable of brightening in a clear whiteness various materials, e.g. cellulose materials such as cotton, paper and pulp, polyamide fibers such as nylon fibers, and fillers for paper such as kaolin, clay and talc.

In the salt-forming reaction, it is not always required that all of the anionic groups contained in an optical brightener component are completely reacted with the basic groups in a color component and it does not matter how many anionic groups participate in the salt-forming reaction. However, it is required that at least one anionic group and basic group from a salt. For the salt-forming reaction, therefore, it is desirable to use an optical brightener component excessively so that the basic group of a color component is reacted with at most all of the anionic groups of an optical brightener, vecause discrimination of the end point of the reaction is thus made easy.

The color salt formed in this way, which is hardly soluble or not soluble in water in many cases, is separated from the reaction mixture by filtration in conventional manner and washed adequately with water to remove water-soluble matters. If necessary, it can readily be purified by the prior art method, for example, by recrystallization.

The color salt can be mixed with an optical brightener in known manner. The color salt is used in the form of a powder, paste, aqueous dispersion or solution in a suitable organic solvent depending upon the form of an optical brightener.

The color salt can be used as a mixture with an optical brightener composition as described above, but during an optical brightening treatment, a suitable amount of the color salt can be added directly to a treating bath or treating mixture. In this case, the color salt can also be used in the form of a powder, paste, aqueous dispersion or solution in a suitable organic solvent.

Useful examples of the water-soluble organic solvent which can be used in the salt-forming reaction are methanol, ethanol, acetone, methyl ethyl ketone, dioxane, ethylene glycol, ethylene glycol monomethyl (or monoethyl) ether, acetamide, dimethyl (or diethyl) acetamide, dimethyl (or diethyl) formamide and dimethyl sulfoxide.

The quantity of the color salt to be used can be varied within a wide range and, in particular, a preferable quantity is determined by a preliminary experiment. The quantity of the color salt depends on the variety of a material to be optically brightened, but it is generally in the range of 1/50 to 1/20000, preferably 1/100 to 1/10000 of the weight of an optical brightener used together.

The color salt-containing optical brightener composition according to the present invention can be applied to various fibrous articles, for example, cellulose acetate fibers, natural protein fibers such as silk and wool, synthetic polyamide fibers such as nylon fibers, fibers of acrylonitrile polymers or copolymers, methacrylate polymers or copolymers, polyesters, polyvinyl chloride, polyolefins such as polyethylene and polystyrene, and cellulose fibrous materials such as cotton, flax, paper and pulp, resinous materials of polyvinyl alcohol, polyurethane, urea or melamine resins and benzoguanamine resins, leather articles, pigments, paints and lacquers.

In the optically brightening treatment of papers, the so-called surface coating method is often carried out by coating papers with a surface coating agent containing an optical brightener. However, the brightening effect is not satisfactory in this method, because clay or kaolin is used as a predominant component of the surface coating agent in many cases and the optical brightener does not have an affinity to clay or kaolin. On the other hand, the color salt of the present invention, in particular, blueish or purplish color salt has a good affinity to clay or kaolin, so not only the visual whiteness is increased, but also the brightening effect of the optical brightener used jointly is increased.

When the color salt-containing optical brightener composition of the present invention is applied to fibrous materials, in general, it is used in the form of an aqueous dispersion finely divided with water and a usual surfactant, because the color salt as a blueing agent is hardly or not soluble in water, and as to the dyeing speed to fibers, it shows a more preferable retarding property than the original basic dye itself used for the production of the color salt. Therefore, the color salt-containing optical brightener composition of the present invention is free from non-level dyeing or spot-like coloring as one advantage, for example, in a case where it is used for polyacrylonitrile fibers. This also produces an economical advantage that addition of a special levelling agent to prevent nonlevel dyeing is not required.

As well known in the art, basic dyes have a mortal disadvantage that the light fastness is low and thus their use is considerably limited in spite of having a clear color tone. In an optically brightening processing, for example, a so-called blueing processing is simultaneously carried out by adding a very small amount of a blue or violet dye to improve the white color tone. In this case, it is naturally desirable from the purpose to use a dye with a clear color tone and such a dye is often chosen from basic dyes. Because of the above described disadvantage, however, those having a relatively clear color tone are unavoidably chosen from disperse dyes in many cases and consequently, some dark color tone cannot be avoided in the brightening effect.

Similarly, it is assumed that the color salt used in the composition of the present invention may have a low light fastness, but in actual fact, the light fastness of our color salt is rather improved and is somewhat higher than that of a complex compound of a basic dye and a complex acid as described in Japanese Pat. No. 19362/1967. This is unexpectedly found not only in a case where the color salt-containing optical brightener composition of the present invention is applied to polyacrylonitrile substrates but also where it is applied to other substrates, for example, polyester, polyamide and cellulose substrates.

Furthermore, the color salt in the composition of the present invention is stable in a resin finishing bath used ordinarily for high quality finishing of fibrous materials. In this resin finishing, a salt of a heavy metal and a strong inorganic acid, for example, zinc chloride, zinc nitrate, magnesium chloride or hydrochloric acid is in many cases used as a catalyst so as to accelerate the reaction of fibers with resins. This catalyst effects unfavourably the coexistent dye. For example, a dye and heavy metal are reacted to form a salt precipitated. On the other hand, the color salt in the composition of the present invention being in a salt form is hardly affected by the above described catalyst. This is another feature of the composition of the present invention.

In the production of a finely divided aqueous dispersion, the color salt in the composition of the present invention can be divided easily and finely in a shorter time as compared with the prior art disperse dye. This results in a level dyeing as described above and the storage stability of the dispersion itself is more excellent.

The following examples are given in order to illustrate the present invention in more detail without limiting the same, in which measurement of $\lambda_{max}$ is carried out by dissolving 1 g of a sample in dimethylformamide (DMF) to give 200 ml of a DMF solution, taking 0.5 ml of this solution and diluting with water to 500 ml.

EXAMPLE 1

Liquid compositions for optically brightening were prepared by the following recipes (A) and (B):

| (A) | Basic Optical Brightener | 150 g |
|---|---|---|
|  | Color Salt (1-1) | 1.5 g |
|  | Acetic Acid (90%) | 75 g |
|  | Nonionic Surfactant | 40 g |
|  | DMF | 1125 g |
|  | Water | 108.5 g |
|  |  | 1500 g |
| (B) | Basic Optical Brightener | 150 g |
|  | Color Salt (1-1) | 1 g |
|  | Color Salt (1-2) | 0.3 g |
|  | Acetic Acid (90%) | 75 g |
|  | DMF | 1125 g |
|  | Nonionic Surfactant | 40 g |
|  | Water | 108.7 g |
|  |  | 1500 g |

Using the above described liquid composition (A) and (B) for optically brightening, a blended fabric consisting of polyacrylonitrile/polyester (90/10) was subjected to an optically brightening treatment.

Firstly, the above described compositions (A) and (B) were respectively taken in a proportion of 1% based on the weight of the fabric and mixed with water to form a dyeing bath with a bath ratio of 40:1 (based on the weight of the fabric). The above described blended fabric was added to the dyeing bath which was then heated from room temperature to 90°–95° C. for about 30 minutes and held at 95°–100° C. for about 30 minutes. Then, the fabric was gradually cooled, washed with water and dried. In each case, the resulting fabric was optically brightened more clearly than the fabric optically brightened with an optical brightener composition prepared by adding no color salt of the present invention, the difference of whiteness corresponding to that of a brightened cloth (2) and a brightened cloth (3) by the optically brightening scale (JIS L 0807, referred herein to as "FW Scale").

In this example, the basic optical brightener is represented by the following formula (1-a):

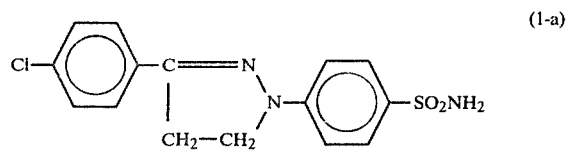

and the color salts are represented by the following formulas (1-1) and (1-2):

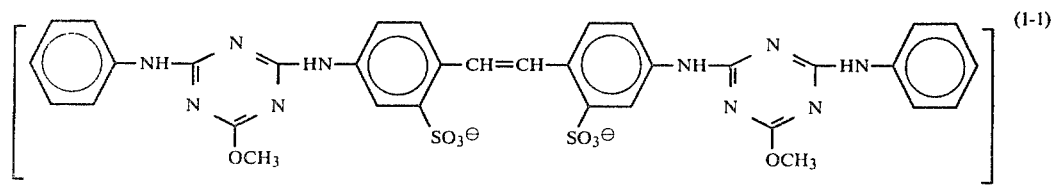

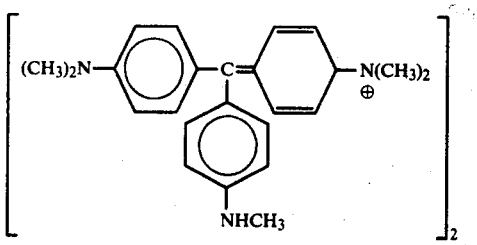
($\lambda_{max}$: 583 nm, 345 nm, 245 nm, DMF+Water)
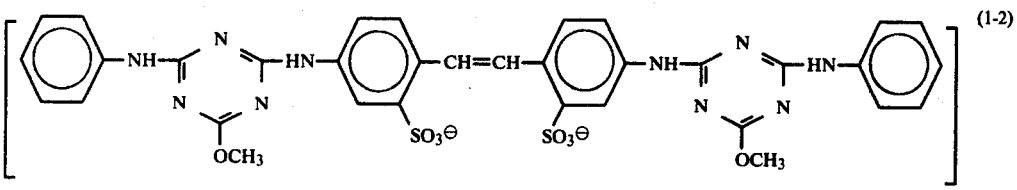
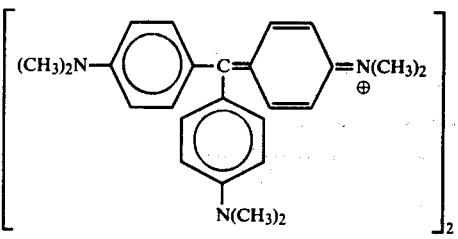
($\lambda_{max}$: 592 nm, 345 nm, 245 nm, DMF+Water)
Other examples of the basic optical brightener used in this example are represented by the following formulas:
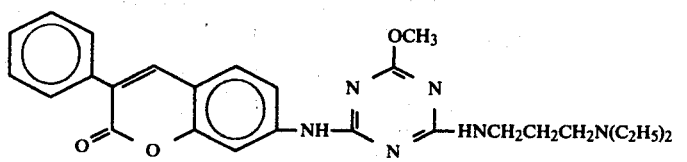
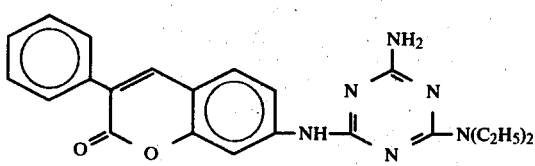
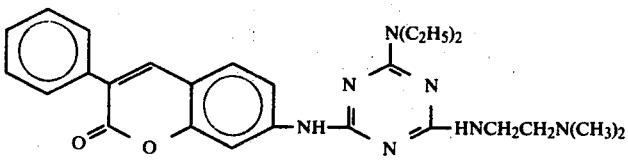
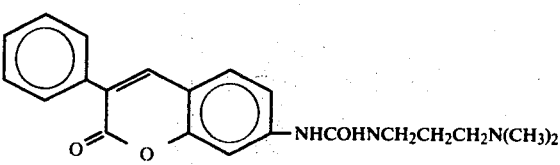

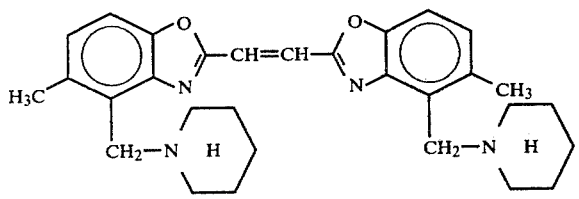
(1-f)
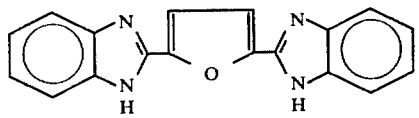
(1-g)
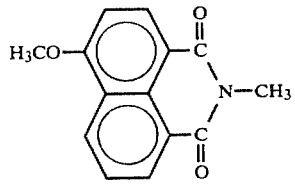
(1-h)
Other exampies of the anionic component of the color salt used in this example are represented by the following formulas:
| No. | Anionic Component | $\lambda_{max}$ (nm) |
|---|---|---|
| 1-3 | ![structure] | 590,336 |
| 1-4 | ![structure] | 590,362 |
| 1-5 | ![structure] | 590,365 |
| 1-6 | ![structure] | 590,355 |
| 1-7 | ![structure] | 590,353 |

| No. | Anionic Component | $\lambda_{max}$ (nm) |
|---|---|---|
| 1-8 | [morpholine-triazine-NH-C₆H₃(SO₃⁻)-CH=]₂ | 590, 362 |
| 1-9 | [Cl-triazine-N(CH₂CH₂OH)₂-HN-C₆H₃(SO₃⁻)-CH=]₂ | 590, 358 |
| 1-10 | [C₆H₅-NH-triazine(NH₂)-HN-C₆H₃(SO₃⁻)-CH=]₂ | 590, 357 |
| 1-11 | [C₆H₅-NH-triazine-NH-C₆H₄SO₃⁻-HN-C₆H₃(SO₃⁻)-CH=]₂ | 590, 358 |
| 1-12 | [phenyl-methyl-triazole-C₆H₃(SO₃⁻)-CH=]₂ | 590, 360 |
| 1-13 | [C₆H₄(SO₃⁻)-CH=CH-C₆H₄-]₂ | 590, 360 |
| 1-14 | [C₆H₄(OCH₂CH₂CH₂SO₃⁻)-CH=CH-C₆H₄-CH=CH-C₆H₄(OCH₂CH₂CH₂SO₃⁻)]₂ | 590, 368 |
| 1-15 | [C₆H₄(OCH₂COO⁻)-CH=CH-C₆H₄-CH=CH-C₆H₄(OCH₂COO⁻)]₂ | 590, 366 |

| No. | Anionic Component | $\lambda_{max}$ (nm) |
|---|---|---|
| 1-16 | [structure: phenyl-NH-triazine(morpholino)-NH-phenyl(SO₃⁻)-CH=]₂ | 590,364 |
| 1-17 | [structure: (SO₃Na)phenyl-NH-triazine(OCH₃)-HN-phenyl(SO₃⁻)-CH=]₂ | 583,345,265 |
| 1-18 | [structure: H₃CO-triazine(NHCH₂CH₂OH)-HN-phenyl(SO₃⁻)-CH=]₂ | 583,345 |
| 1-19 | [structure: phenyl-O-triazine(NHCH₂CH₂OH)-HN-phenyl(SO₃⁻)-CH=]₂ | 583,345 |
| 1-20 | [structure: morpholino-triazine(NH-phenyl-SO₃Na)-HN-phenyl(SO₃⁻)-CH=]₂ | 583,345,270 |
| 1-21 | [structure: (HOCH₂CH₂)₂N-triazine(HN-phenyl-SO₂NH₂)-HN-phenyl(SO₃⁻)-CH=]₂ | 583,350 |
| 1-22 | [structure: (SO₃Na,SO₃Na)phenyl-HN-triazine(N(C₂H₅)₂)-HN-phenyl(SO₃⁻)-CH=]₂ | 583,350 |

-continued

| No. | Anionic Component | $\lambda_{max}$ (nm) |
|---|---|---|
| 1-23 | ![structure] | 583,345 |

The corresponding color salts were respectively obtained by ahe reaction of these anionic components with the cationic components in the foregoing formulas (1-1) and (1-2) and used for the same purpose. $\lambda_{max}$ in the above table is that of the color salt obtained by the use of the cationic component of the formula (1-1).

EXAMPLE 2

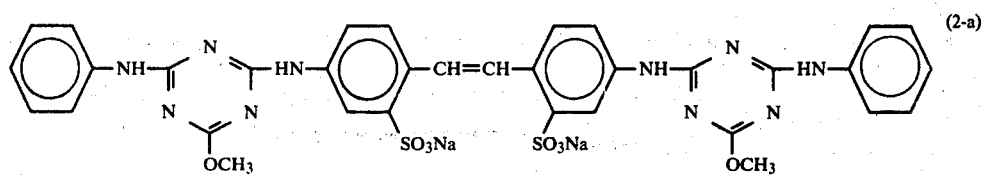

(2-a)

1 g of an optical brightener represented by the above formula (2-a) was dissolved in water and diluted to 100 ml, from which 5 ml was partly taken as sample. On the other hand, 5 g of the color salt represented by the foregoing formula (1-1) was dissolved in DMF and diluted to 1000 ml. 1 ml of the resulting solution was further diluted with DMF from which 0.5 ml was partly taken as a sample. Both the samples were combined and diluted with water to 200 ml to prepare a dyeing bath. 5 g of a nylon plain weave fabric was processed at 85° to 90° C. for 30 minutes in the dyeing bath, washed with water and dried. The resulting brightened fabric showed a much clearer whiteness than another fabric brightened in another dyeing bath having the same concentration but free from the color salt of the present invention. The difference of whiteness corresponded to that of a whitened cloth (2) and a whitened cloth (3) by the optically whitening scale of JIS L 0807.

EXAMPLE 3

4 ml of the aqueous solution of the optical brightener used in Example 2 was taken, while 0.4 ml of the DMF solution of the color salt used in Example 2 was taken. Both the solutions were combined and diluted with water, to which acetic acid was added in a proportion of 1% (owf) and water was added to adjust the volume to 200 ml. 4 g of wool yarn was charged therein and processed at 70° C. for 40 minutes. The resulting brightened yarn showed a much clearer whiteness than a yarn brightened in another dyeing bath having the same concentration but being free from the color salt of the present invention. The difference of whiteness corresponded to that of a brightened cloth (2) and a brightened cloth (3) by the optically brightening scale of JIS L 0807.

EXAMPLE 4

2 g of a pulp (composition: L-BKP/N-BKP=3/1) was suspended in water to prepare a 1% suspension to which an optical brightener and our color salt represented respectively by the following formulas (4-a) and (4-1) and other required reagents were added according to the following recipe, the color salt having $\lambda_{max}$ of 592 nm, 350 nm and 265 nm (DMF+water):

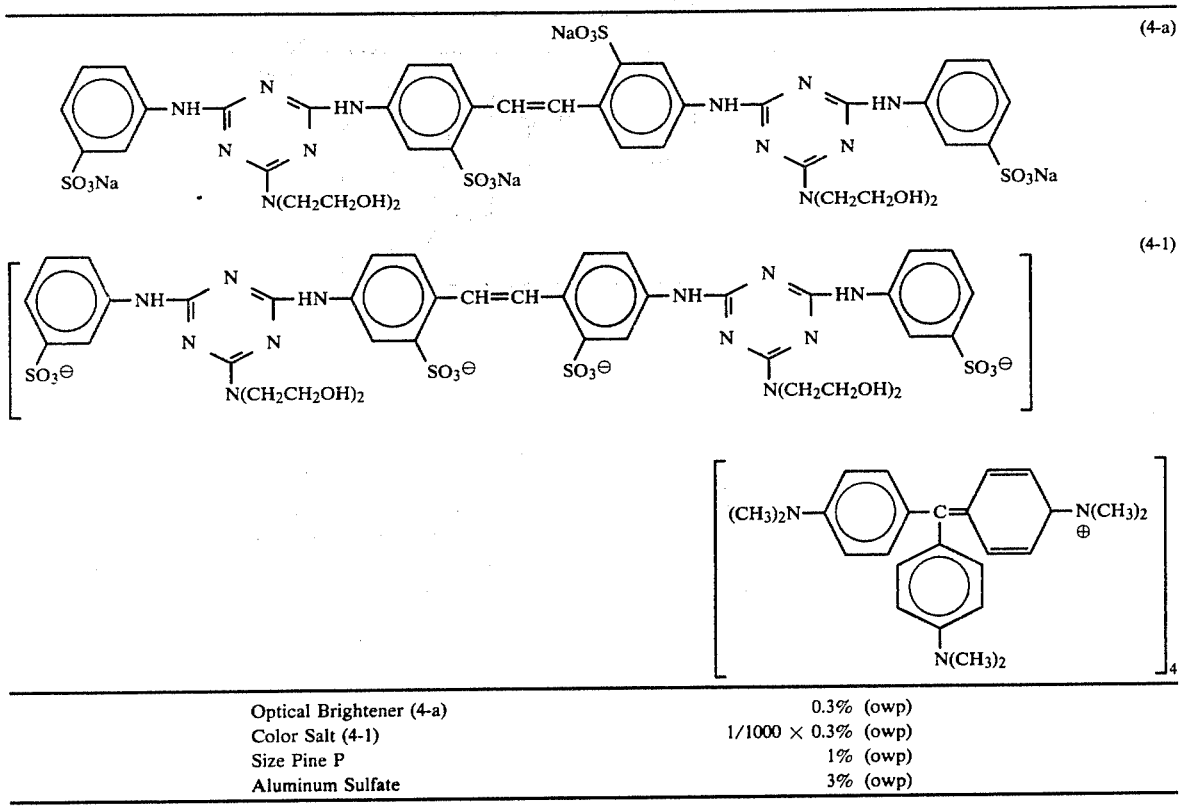

| | |
|---|---|
| Optical Brightener (4-a) | 0.3% (owp) |
| Color Salt (4-1) | 1/1000 × 0.3% (owp) |
| Size Pine P | 1% (owp) |
| Aluminum Sulfate | 3% (owp) |

The pulp suspension was stirred uniformly, subjected to paper making, pressed and then dried. The thus resulting brightened paper had a clearer whiteness than a brightened paper with the same composition but free from the color salt of the present invention. Measurement of their reflectivities using a Hitachi Spectrophotometer 139 type with an accessory of 1009-680 type gave the following results:

| | Reflectance at 440 nm |
|---|---|
| Optical Brightener-containing paper | 95.4% |
| (Optical Brightener + Color Salt)-containing Paper | 98.8% |

This difference of whiteness corresponded visually to that of a brightened cloth (2) and a brightened cloth (3) by the optically brightening scale of JIS L 0807.

EXAMPLE 5

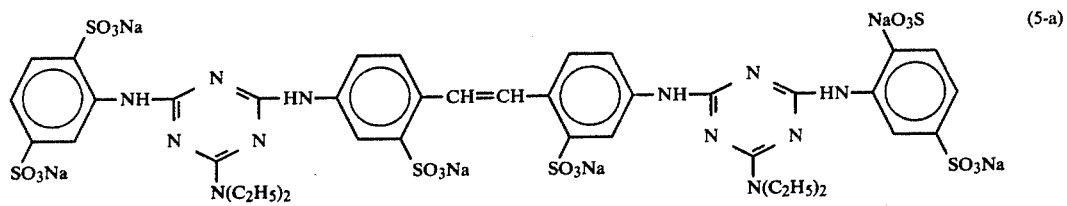

3.5 g of an optical brightener represented by the above described formula (5-a) was dissolved in 50 ml of water, to which 5 ml of a dispersion was added, which had been obtained by preparing previously 1 ml of an aqueous dispersion of a color salt ($\lambda_{max}$: 592 nm, 350 nm) represented by the following formula (5-1) in a concentration of 7 g/100 ml and further diluting the aqueous dispersion with water to 100 ml:

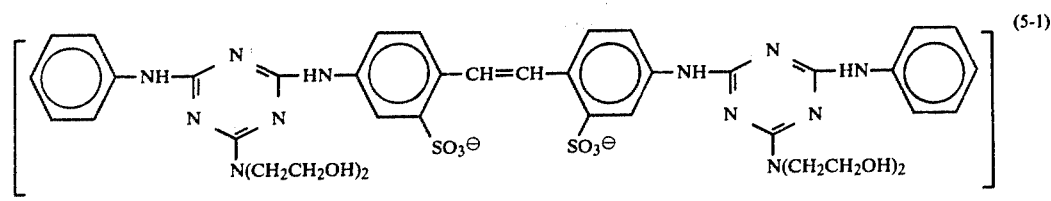

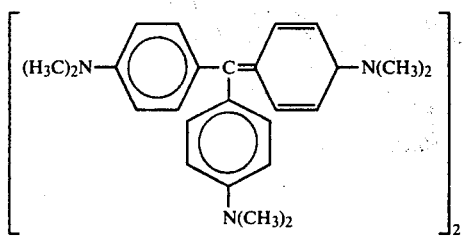

On the other hand, an aqueous coating composition was prepared having the following recipe:

| | |
|---|---|
| Casein | 45 g |
| Styrene/Butadiene Latex | 70 g |
| Sodium Tripolyphosphate | 2 g |
| Surfactant of Sulfuric Acid Ester of Polyethylene Glycol Dodecyl Alcohol Ether | 0.2 g |
| Porcelain | 400 g |
| Concentrated Ammonia | 12 g |
| Water | 470.8 g |
| | 1000 ml |

This solution was added to the foregoing solution containing the optical brightener (5-a) and color salt (5-1) and uniformly mixed. The surface of a paper was coated with the resulting composition in a sizing press to obtain a coated paper with a clear whiteness. In comparison with a paper processed with a coating solution having the same composition but being free from the color salt of the present invention, the difference of whiteness corresponded to that of a brightened cloth (2) and a brightened cloth (3) by the optically brightening scale of JIS L 0807.

EXAMPLE 6

0.2 g of the optical brightener (5-a) used in Example 5 and 0.2×1/1000 g of the color salt (5-1) used in Example 5 were added to a paper coating composition having the following recipe:

| | |
|---|---|
| Clay for Coating | 90 g |
| Light Calcium Carbonate | 10 g |
| Oxidized Starch | 8 g |
| Styrene/Butadiene Latex | 11 g |
| Hydroxyethyl Cellulose | 1.5 g |

The resulting composition was mixed with 79.5 g of water to give a slurry for paper coating with a pigment content of about 50%, coated onto a paper substrate of 78 g/m² containing a filler, sizing agent and paper strengthening agent in conventional manner in such a quantity that the one side be 25 g/m², dried and subjected to a luster finishing. The thus resulting coated paper showed a clearer whiteness than a paper coated with another coating composition having the same composition but being free from the color salt of the present invention. The difference of whiteness corresponded visually to the difference of a brightened cloth (2) and a brightened cloth (3) of FW Scale.

EXAMPLE 7

Using a triethylamine salt of optical brightener having the same anionic component as that of the formula (1-1) of Example 1 and the color salt represented by the formula (1-1), an aqueous dispersion was prepared according to the following recipe:

| | |
|---|---|
| Optical Brightener (Triethylamine Salt) | 100 g |
| Color Salt (1-1) | 0.4 g |
| Nonionic Surfactant | 10 g |
| Anionic Surfactant | 1 g |
| Defoaming Agent | 0.1 g |
| Water | 88.5 g |

This aqueous dispersion was taken to give a concentration of 3 g/l, and a knitted cotton cloth was subjected to padding at room temperature in this dispersion, squeezed in such a manner that the liquid absorption ratio be 80% based on the weight of the cloth and dried at 70° to 80° C. The thus resulting optically brightened cloth showed a clearer whiteness than a brightened cloth processed with another dispersion having the same composition but being free from the color salt of the present invention. The difference of whiteness corresponded visually to the difference of a brightened cloth (4) and a brightened cloth (3) of FW Scale.

EXAMPLE 8

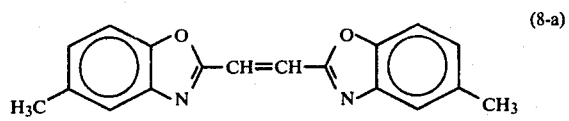

(8-a)

To an aqueous dispersion containing an optical brightener represented by the above described formula (8-a), as effective component, in a concentration of 8.5% was added a color salt represented by the following formula (8-1) in a proportion of 1/10,000% by weight based on the whole composition, thus obtaining a uniformly dispersed composition according to the present invention:

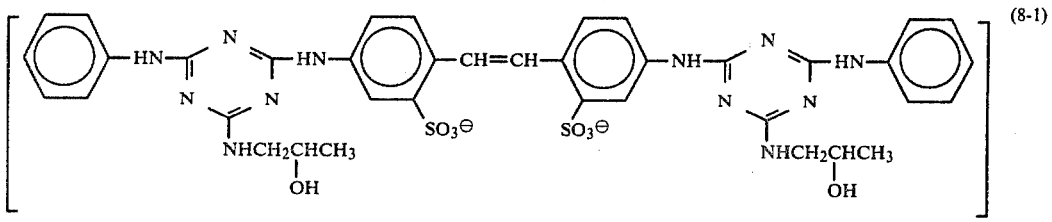

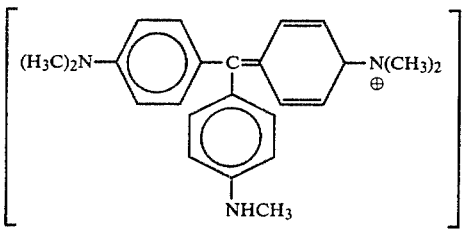

A tetron plain weave fabric was impregnated at room temperature in a padding machine with an aqueous dyeing liquor which comtains 10 g/l of the above described aqueous dispersion. The impregnated goods were treated under the following condition:

| Squeezing Ratio (Based on dry fabric) | 80% |
|---|---|
| Pre-Drying | 100° C. × 3 minutes |
| Thermal Fixing | 180° C. × 1 minutes |

The thus resulting brightened fabric showed a much clearer whiteness than brightened by another aqueous dispersion having the same composition but being free from the color salt of the present invention. The difference of whiteness corresponded visually to the difference of a brightened cloth (3) and a brightened cloth (2) or FW Scale.

A blended yarn plain weave fabric was impregnated at room temperature in padding machine with the following resin finishing liquor which contained 10 g/l of the above described aqueous dispersion:

| Sumitex resin NS-16 (Synthetic resin precondensation of glyoxal type made by Sumitomo Chemical Industry Co., Ltd.) | 120 g/l |
|---|---|
| Accelerator MX (Acidic catalyst of magnesium chloride type made by Sumitomo chemical Industry Co., Ltd.) | 49 g/l |

The impregnated goods were treated under the above described conditions.

After padding of the fabric with the above described dyeing bath, the fabric was treated under the above described conditions. The thus resulting brightened fabric by the resin finishing bath showed a much clearer whiteness than brightened by another processing bath having the same composition but being free from the color salt of the present invention. The difference of whiteness corresponded visually to that of a brightened cloth (4) and a brightened cloth (2) of FW Scale. It is apparent from this result that the composition of the present invention is stable in a resin finishing bath and capable of giving sufficiently the brightening effect.

EXAMPLE 9

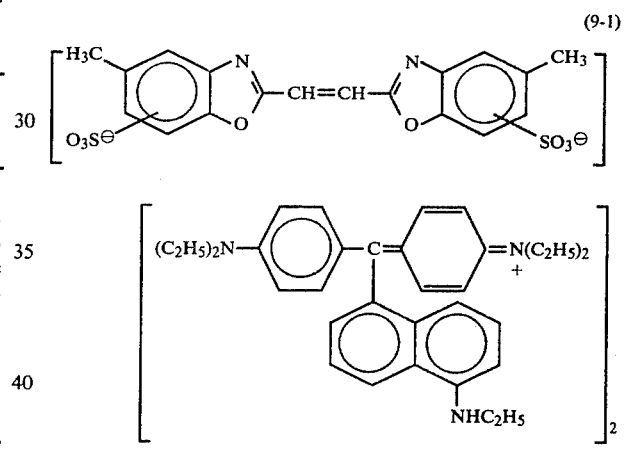

Using a color salt ($\lambda_{max}$: 622 nm, 371 nm, DMF+Water) represented by the above described formula (9-1), a polyvinyl chloride composition was prepared according to the following recipe:

| Polyvinyl Chloride | 65 g |
|---|---|
| Dioctyl Phthalate | 35 g |
| Sn-containing Organo Stabilizer | 2 g |
| Titanium Dioxide (Rutile Type) | 1 g |
| Optical Brightener (8-a, powdered) | 0.1 g |
| Color Salt (9-1) | 0.001 g |

This polyvinyl chloride composition was rolled with rubbing somewhat at 165° to 170° C. for 5 minutes on heated rolls and stretched by mean of a roller calender to form a film of about 300 microns in thickness. The thus resulting film had a clearer whiteness than another film having the same composition but being free from the color salt of the present invention. The difference of whiteness corresponded visually to that of a brightened cloth (3) and a brightened cloth (2) of FW Scale.

In this example, a color salt of an anionic component represented by the following formula (9-2) and the cationic component in the foregoing formula (9-1) could be used also for the similar purpose:

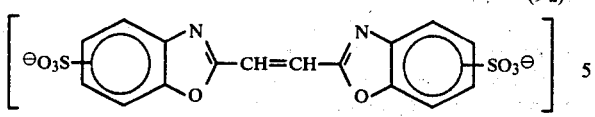
(9-2)

EXAMPLE 10

An optical brightener represented by the following formula (10-9):

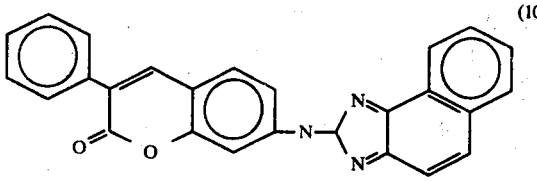
(10-a)

and a color salt represented by the following formula (10-1):

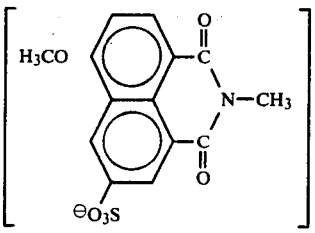
(10-1)

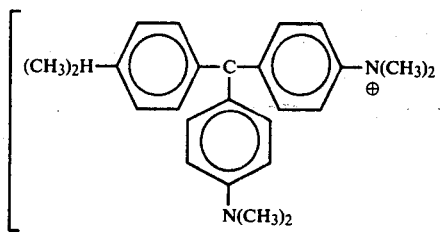

were charged in an autoclave equipped with a stirrer according to the following recipe:

| | |
|---|---|
| Dimethyl Terephthalate | 600 g |
| Ethylene Glycol | 500 ml |
| Zine Acetate | 3 g |
| Optical Brightener (10-a) | 0.4 g |
| Color Salt (10-1) | 0.004 g |

The transesterification reaction was carried out therein at about 180° C., and the issued methanol was recovered. After 1 hour, the temperature was raised to 200° C. and after further 45 minutes, it was raised to 220° C. After about 2 hours 45 minutes, the transesterification reaction was completed. The reaction mixture was charged in another autoclave heated at 275° C. under pressure of nitrogen for the precondensation. The excessive glycol was flowed out and recovered. After 45 minutes, the autoclave was evecuated and held under a pressure of 1 mmHg or less with stirring slowly for another 45 minutes. After the polycondensation was completed, the melt was subjected to extrusion in known manner to obtain filaments of 50/25 denir. The thus resulting filament showed a clearer whiteness than that obtained in analogous manner but adding no color salt of the present invention. The visual difference of whiteness corresponded to that of a brightened cloth (3) and a brightened cloth (2) of FW Scale.

EXAMPLE 11

100 g of polyethylene granules for injection molding was mixed with 1 g of titanium dioxide (rutile type) in an over head mixer, to which 0.1 g of a powdered mixture of the optical brightener represented by the foregoing formula (8-a) and the color salt represented by the foregoing formula (8-1) in a proportion of 100:1 according to the present invention was added followed by blending, and the mixture was subjected to injection molding to form small flat plates using an injection molding machine. The thus resulting small polyethylene plate showed a clearer whiteness than that obtained by adding the optical brightener only. The visual difference of whiteness between them corresponded to that of a brightened cloth (4) and a brightened cloth (3) of FW Scale.

Example 12

0.02 g of a powdered mixture of the optical brightener represented by the foregoing formula (1-h) and the color salt used in Example 11 in a proportion of 100:1 according to the present invention was added to 100 g of polymethacrylate chips, mixed adequately in an over head mixer and then subjected to injection molding. The thus resulting small polymethacrylate plate showed a more excellent transparency.

EXAMPLE 13

100 g of polystyrene chips, 1 g of titanium dioxide (rutile type) and 0.1 g of a powdered mixture of the optical brightener used in Example 10 and the color salt used in Example 11 in a proportion of 100:1 according to the present invention were mixed adequately, subjected to rolling on heated rolls at 155° to 160° C., granulated and molded in small plates at 240° to 250° C. using an injection molding machine. The thus resulting small polystyrene plate showed a higher whiteness than that obtained by adding the optical brightener only and being free from the color salt of the present invention. The difference of whiteness between them corresponded visually to that of a brightened cloth (3) and a brightened cloth (2) of FW Scale.

EXAMPLE 14

| | |
|---|---|
| Ure | 100 g |
| Formalin (37%, neutral) | 200 g |
| Hexamethylenetetramine | 5 g |

The above described composition was blended, heated and reacted to form a resinous liquor, after which the liquor was adequately blended in a kneader with the following materials:

| | |
|---|---|
| α-Cellulose | 60 g |
| Ammonium Chloride | 0.05 g |
| Zinc Stearate | 0.2 g |
| Zinc White | 0.5 g |

The resulting mixture was dried for 90 minutes in a hot air drier at 80° C. and pulverized in a pot mill. To this fine powder was added a finely powdered mixture of a triethylamine salt of optical brightener having the same anionic component as that of the formula (1-1) used in Example 1 and 1 color salt represented by the following formula (14-1) in a proportion of 1000:1 according to the present invention, the latter fine powder being in a proportion of 0.2% by weight based on the whole composition, and the mixture was uniformly mixed. The resulting composition was formed in conventional manner to give a urea resin article showing a clearer purplish whiteness than that obtained without using the color salt. The visual difference of whiteness was that of (2) and (3) by FW Scale.

EXAMPLE 15

In 100 ml of water was dissolved 1.5 g of a composition of the present invention comprising an optical brightener, as a predominant component, represented by the following formula:

with the same concentration but being free from the above described color salt. The visual difference of whiteness corresponded to that of a brightened cloth (4) a brightened cloth (3) by FW Scale.

The color salt-containing composition used in this example was prepared as follows:

1000 g of cyanuric chloride was reacted in known manner with methanol, sodium 4,4'-diaminostilbene-2,2'-disulfonate and aniline in order to obtain a reaction mixture containing an optical brightener represented by the following formula:

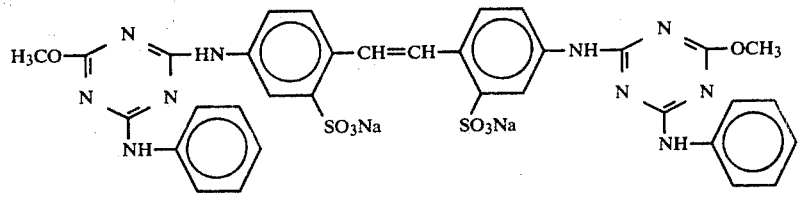

Insoluble matters were removed by filtration from the hot reaction mixture and the pH of the filtrate was adjusted to neutral or weakly alkaline. To this filtrate was added with agitation at 70° to 80° C. 4.5 g of a basic color component represented by the following formula:

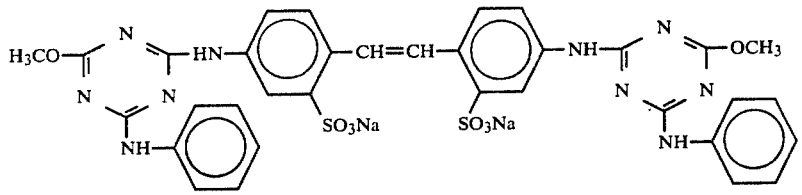

and a color salt represented by the following formula, in a proportion by weight of 1/2000 of the composition:

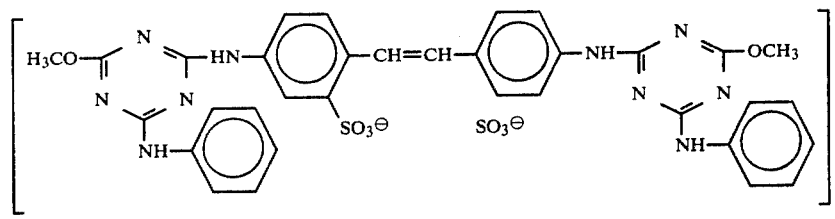

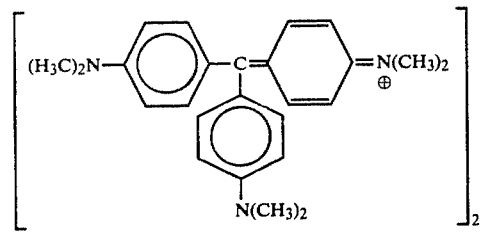

A cotton broadcloth was subjected to pad dyeing with this solution at room temperature, squeezed by means of a mangle in such a manner that the liquid absorption ratio be 80% based on the weight of the dry cloth and dried.

The thus resulting brightened cotton broadcloth was more excellent in visual whiteness as compared with that brightened with the optical brightener composition

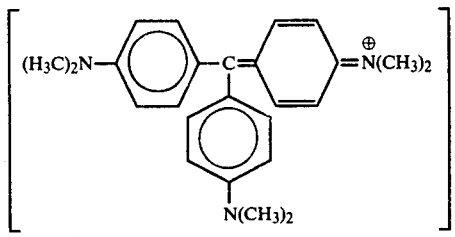

and the solution was allowed to cool to about 40° to 50° C. Then, sodium sulfate crystal was added in a proportion of about 12% by weight to the solution to precipitate well the product, followed by filtering, drying and pulverizing, and there was thus obtained a composition of the present invention comprising the above described optical brightener, as a predominant component, and a color salt of the above described optical brightener and the basic color component.

What is claimed is:

1. An optical brightener composition comprising at least one optical brightener and at least one color salt consisting of an optical brightener component having at least one anionic group and a color component having at least one basic group capable of forming a salt with the anionic group.

2. The optical brightener composition of claim 1, wherein the optical brightener is selected from the group consisting of 4,4'-bistriazinylaminostilbene, 1,2,3-triazolylstilbene, 1,4-bisstyrylbenzene, 4,4'-bisstyrylbiphenylene, pyrazoline, coumarin, α, β-dioxazolyl- or diimidazolylethylene, pyrene and naphthalic acid imide.

3. The optical brightener composition of claim 1, wherein the optical brightener component is selected from 4,4'-bistriazinylaminostilbene, 1,2,3-triazolylstilbene, 1,4-bisstryrylbenzene, 4,4'-bisstyrylbiphnylene, pyrazoline, coumarin, α, β-dioxazolyl- or diimidazolylethylene, pyrene and naphthalic acid imide type.

4. The optical brightener composition of claim 1, wherein the anionic group is selected from sulfonic acid group, carboxylic acid group, and their alkali metal salt groups and ammonium salt group.

5. The optical brightener composition of claim 1, wherein the color component is selected from azo, anthraquinone, diphenylmethane, triphenylmethane, xanthene, acridine, azine, oxazine, thiazine, methine and phthalocyanine types.

6. The optical brightener composition of claim 1, wherein the basic group is selected from quaternized alkylamino group, acridine group, oxazine group, azine group, thiazine group and cationized nitrogen atom.

7. The optical brightener composition of claim 1, wherein the color salt is mixed in the form of a powder, paste, aqueous dispersion or solution in an organic solvent.

8. The optical brightener composition of claim 1, wherein the color salt is in a proportion of 1/50 to 1/20000 to the weight of the optical brightener.

9. The optical brightener composition of claim 1, wherein the color salt is produced by mixing a solution of an optical brightener having at least one anionic group in water or in a mixed medium of water and a water-soluble organic solvent and solution of a coloring agent having at least one basic group capable of forming a salt with the anionic group of the optical brightener in water or in a mixed medium of water and a water-soluble organic solvent, and thereby precipitating the color salt.

10. The optical brightener composition of claim 9, wherein the water-soluble organic solvent is selected from the group consisting of methanol, ethanol, acetone, methyl ethyl ketone, dioxane, ethylene glycol, ethylene glycol monomethyl ether, ethylene glycol monoethyl ether, acetamide, dimethylacetamide, diethylacetamide, dimethylformamide, diethylformamide and dimethyl sulfoxide.

* * * * *